United States Patent [19]

Shibayama

[11] Patent Number: 5,663,835
[45] Date of Patent: Sep. 2, 1997

[54] INNER FOCUS ZOOM LENS

[75] Inventor: Atsushi Shibayama, Tokyo, Japan

[73] Assignee: Nikon Corporation, Tokyo, Japan

[21] Appl. No.: 501,650

[22] Filed: Jul. 12, 1995

[30] Foreign Application Priority Data

| Jul. 29, 1994 | [JP] | Japan | 6-177896 |
| Jul. 29, 1994 | [JP] | Japan | 6-177897 |
| Feb. 1, 1995 | [JP] | Japan | 7-014869 |

[51] Int. Cl.$^6$ .................................................. G02B 15/14
[52] U.S. Cl. .................................. 359/684; 359/686
[58] Field of Search .............................. 359/684, 686, 359/689

[56] References Cited

U.S. PATENT DOCUMENTS

| 4,516,839 | 5/1985 | Tokumaru | 359/686 |
| 4,591,235 | 5/1986 | Tokumaru et al. | 359/680 |
| 4,636,040 | 1/1987 | Tokumaru | 359/689 |
| 4,653,873 | 3/1987 | Kawamura | 359/685 |
| 4,846,562 | 7/1989 | Tokumaru et al. | 359/680 |
| 5,132,848 | 7/1992 | Nishio et al. | 359/740 |
| 5,276,553 | 1/1994 | Tatsuno | 359/686 |

FOREIGN PATENT DOCUMENTS

| 56-21112 | 2/1981 | Japan . |
| 57-5012 | 1/1982 | Japan . |
| 58-143312 | 8/1983 | Japan . |
| 2-296208 | 12/1990 | Japan . |
| 4-235514 | 8/1992 | Japan . |
| 5-107476 | 4/1993 | Japan . |
| 5-173071 | 7/1993 | Japan . |
| 5-173070 | 7/1993 | Japan . |
| 5-67930 | 9/1993 | Japan . |

*Primary Examiner*—Scott J. Sugarman
*Attorney, Agent, or Firm*—Shapiro and Shapiro

[57] ABSTRACT

An inner focus zoom lens is, sequentially from an object side, constructed of a first lens unit exhibiting a negative refracting power, a second lens unit exhibiting a positive refracting power, a third lens unit exhibiting a negative refracting power and a fourth lens unit exhibiting a positive refracting power. Focusing from a long distance object to a short distance object is performed by integrally moving the second lens unit and the third lens unit toward an image-surface direction. Alternatively, an inner focus zoom lens is, sequentially from the object side, constructed of a first lens unit exhibiting a positive refracting power, a second lens unit exhibiting a negative refracting power, a third lens unit exhibiting a positive refracting power and a fourth lens unit exhibiting a positive refracting power. The focusing from the long distance object to the short distance object is effected by integrally moving the second lens unit and the third lens unit toward the image-surface direction.

16 Claims, 8 Drawing Sheets

INNER FOCUS ZOOM LENS

BACKGROUND OF THE INVENTION

1. Field of the Invention

The present invention relates generally to a zoom lens and, more particularly, to an inner focus zoom lens suited to an autofocus camera.

2. Related Background Art

There have hitherto been proposed a multiplicity of zoom lenses each including a first negative lens unit, a second positive lens unit, a third negative lens unit and a fourth positive lens unit or including a first positive lens unit, a second negative lens unit, a third positive lens unit and a fourth positive lens unit. The great majority of such zoom lenses adopt a so-called first lens unit extension focusing system in which focusing is conducted by moving the first lens unit.

When the zoom lens based on the conventional first lens unit extension focusing system is mounted in an autofocus camera, the first lens unit, which is the largest and heaviest lens unit, is driven by a motor, and, therefore, the focusing is hard to speed up. Under such circumstances, the focusing performed by a lens unit exclusive of the first lens unit was proposed in Japanese Patent Publication No. 5-67930 and Japanese Patent Application Laid-Open Nos. 2-296208, 4-235514, 5-107476, 5-173070, 5-173071, 57-5012, 56-21112 and 58-143312.

The zoom lens in the second embodiment in Japanese Patent Publication No. 5-67930 is constructed of a first negative lens unit, a second positive lens unit, a third negative lens unit and a fourth positive lens unit, wherein the focusing is effected by moving the third lens unit. There arises, however, a problem wherein a focusing moving quantity is 5.285 mm with respect to a photographing distance of 1.5 m and therefore reaches substantially 10% of a focal length (49 mm) at the telephoto end, and the zoom lens increases in size to secure a moving space of the focusing lens unit. Another problem is that the image forming magnification of the third lens unit for focusing is required to be in the vicinity of −1 at the wide angle end, and a degree of freedom of a power construction is restricted, resulting in a difficulty in terms of designing.

The zoom lens in the embodiment in the Japanese Patent Application Laid-Open No. 2-296208 is constructed of a first negative lens unit, a second positive lens unit, a third negative lens unit and a fourth positive lens unit. The first lens unit is divided into two lens subunits, and the closer-to-image-surface lens subunit of these subunits is moved, thus performing the focusing. However, the first lens unit is divided into the two lens subunits, and hence the zoom lens is constructed of substantially five lens units. Therefore, the problem is an increase in costs with a rise in the number of the lens units.

The zoom lens in the embodiment in the Japanese Patent Application Laid-Open No. 4-235514 is constructed of a first negative lens unit, a second positive lens unit, a third negative lens unit and a fourth positive lens unit. The focusing is effected by moving the third lens unit or the third lens unit and the fourth lens unit. However, the focusing moving quantity with respect to the same photographing distance largely differs depending on the focal length, and there arises a problem of causing defocus when the zooming is carried out after performing the focusing operation.

The zoom lens in the embodiment in the Japanese Patent Application Laid-Open No. 5-107476 is constructed of a first negative lens unit, a second positive lens unit, a third negative lens unit, a fourth positive lens unit and a fifth positive lens unit. The focusing is effected by moving the fifth lens unit. As in the case of Japanese Patent Application Laid-Open No. 4-235514, however, the focusing moving quantity with respect to the same photographing distance largely differs depending on the focal length, and there also arises the problem of causing defocus when the zooming is carried out after performing the focusing operation.

The zoom lens in each embodiment in the Japanese Patent Application Laid-Open Nos. 5-173070 and 5-173071 is constructed of a first negative lens unit, a second positive lens unit, a third negative lens unit and a fourth positive lens unit. The second lens unit is divided into two lens subunits, and the closer-to-object lens subunit of these subunits is moved, thus performing the focusing. However, the second lens unit is divided into the two lens subunits, and, therefore, the zoom lens is constructed of substantially five lens units. Accordingly, the problem is the increase in costs with the rise in the number of the lens units.

The zoom lens in the embodiment in the Japanese Patent Application Laid-Open No. 57-5012 is constructed of a first positive lens unit, a second negative lens unit, a third positive lens unit and a fourth positive lens unit. The focusing is executed by moving the fourth lens unit in the optical-axis direction. However, the focusing moving quantity with respect to the same photographing distance largely differs depending on the focal length, and there arises the problem of causing the defocus when the zooming is carried out after performing the focusing operation.

The zoom lens in the embodiment in Japanese Patent Application Laid-Open No. 56-21112 is constructed of a first positive lens unit, a second negative lens unit, third negative lens unit and a fourth positive lens unit. An afocal air spacing is formed within the fourth lens unit, and the focusing is carried out by integrally moving the lens elements from the second lens unit up to the portion of the fourth lens unit, adjacent to the object side of the afocal air spacing in the optical-axis direction. According to this focusing method, the focusing moving quantity with respect to the same photographing distance is fixed without depending on the focal length. The first lens unit and the fourth lens unit are, however, fixed during the zooming, and, hence, it is difficult to reduce an entire length of the zoom lens.

The zoom lens in the embodiment of Japanese Patent Application Laid-Open No. 58-143312 is constructed of a first positive lens unit, a second negative lens unit, a third positive lens unit and a fourth positive lens unit. The focusing is conducted by integrally moving the third lens unit and the fourth lens unit in the optical-axis direction. According to this focusing method, the zoom lens is constructed so that a relational expression $(fA \cdot \beta F) / (\beta F^2 - 1)^{1/2}$ between the combined focal length $fA$ of the closer-to-object lens unit than the focusing lens unit and the image forming magnification $\beta F$ of the focusing lens unit is substantially fixed during the zooming. The focusing moving quantity with respect to the same photographing distance can be thereby substantially fixed without depending on the focal length.

However, there exists a problem in which the degree of freedom of the power construction is limited in terms of a constraint of satisfying this relational expression, resulting in a difficulty of designing.

SUMMARY OF THE INVENTION

It is a primary object of the present invention to provide an inner focus zoom lens in which a focusing moving quantity, with respect to the same photographing distance, is substantially fixed irrespectively of focal length without bringing about an increase in the number of lens units due to inner focusing, an optical design is comparatively easy, and an entire length thereof can be reduced.

To accomplish the above object, a zoom lens according to a first aspect of the present invention comprises, sequentially from an object side, a first lens unit exhibiting a negative refracting power, a second lens unit exhibiting a positive refracting power, a third lens unit exhibiting a negative refracting power and a fourth lens unit exhibiting a positive refracting power. When effecting zooming from a wide-angle end to a telephoto end, the fourth lens unit moves toward an object side while reducing an air spacing between the first lens unit and the second lens unit, extending an air spacing between the second lens unit and the third lens unit and reducing an air spacing between the third lens unit and the fourth lens unit. The zoom lens is constructed to perform focusing from a long distance object to a short distance object by integrally moving the second lens unit and the third lens unit toward an image side.

Based on the above construction, it is desirable that the zoom lens be constructed to satisfy the following condition:

$$0.1 < X4 / f4 < 0.47$$

where X4 is the moving quantity of the fourth lens unit with respect to the image plane when effecting the zooming from the wide-angle end to the telephoto end, and f4 is the focal length of the fourth lens unit.

Further, according to the above fundamental construction, it is desirable that the zoom lens be constructed to satisfy the following conditions:

$$|B4W| < 0.35$$

$$|B4T| < 0.35$$

where B4W is the image forming magnification of the fourth lens unit at the wide-angle end, and B4T is the image forming magnification of the fourth lens unit at the telephoto end.

Still further, according to the above fundamental construction, it is desirable that the zoom lens be constructed to satisfy the following condition:

$$-0.25 < |B4W| - |B4T| < 0.25$$

where B4W is the image forming magnification of the fourth lens unit at the wide-angle end, and B4T is the image forming magnification of the fourth lens unit at the telephoto end.

Also, according to the above fundamental construction, it is desirable that the zoom lens be constructed to satisfy the following conditions:

$$|f4 / f1\text{-}3W| < 0.4$$

$$|f4 / f1\text{-}3T| < 0.25$$

where f4 is the focal length of the fourth lens unit, f1-3W is the combined focal length from the first lens unit to the third lens unit at the wide-angle end, and f1-3T is the combined focal length from the first lens unit to the third lens unit at the telephoto end.

Generally, in the zoom lens including the first negative lens unit, the second positive lens unit, the third negative lens unit and the fourth positive lens unit, lens diameters of the second and third lens units are smaller than those of the first and fourth lens units, and moving the second or third lens unit is desirable because of a smaller load on the motor when performing the autofocusing.

When executing the focusing by moving only the second lens unit, however, the focusing moving quantity with respect to the same photographing distance largely changes depending on the focal length. Further, for certain focal lengths, when the image forming magnification of the second lens unit is −1, focusing is impossible.

Further, even when the focusing is carried out by moving only the third lens unit, the focusing moving quantity with respect to the same photographing distance largely varies depending on the focal length.

Thus, according to a first aspect of the present invention, the focusing is effected by moving the second and third lens units together. The variations in the focusing moving quantity, with respect to the same photographing distance, due to changes in the focal length can be thereby made smaller than in the two cases given above. In this situation, it is desirable that an on-axis light beam passing between the third lens unit and the fourth lens unit be approximate to an afocal state.

If the on-axis light beam traveling between the third and fourth lens units is completely afocal at all times over a range from the wide-angle end to the telephoto end, it follows that the focusing effected by integrally moving the second and third lens units toward the image side is substantially the same as the focusing performed by moving the first lens unit toward the object side, and the focusing moving quantity is fixed without depending on the focal length. In this case, however, the position of the fourth lens unit does not shift even when performing the zooming. Further, the fourth lens unit has no zooming action. It is therefore difficult to attain down-sizing and a higher zoom ratio of the zoom lens.

Thus, a desirable construction is that the on-axis light beam passing between the third lens unit and the fourth lens unit is a weak converging light beam at the wide-angle end and a weak diverging light beam at the telephoto end. In this situation, when performing the zooming from the wide-angle to the telephoto end, a desirable construction is that the fourth lens unit moves toward the object. For attaining such a construction, when effecting the zooming from the wide-angle end to the telephoto end, it is desirable that the air spacing between the first and second lens unit be reduced, the air spacing between the second and third lens units be extended and the air spacing between the third and fourth lens units be reduced.

Furthermore, in the above construction, the focusing is conducted by moving the second and third lens units together, and, for the purpose of decreasing the variations in the focusing moving quantity with respect to the same photographing distance due to the focal length, it is desirable to satisfy any one of the following conditions (1) through (6).

| | |
|---|---|
| $0.1 < X4 / f4 < 0.47$ | (1) |
| $|B4W| < 0.35$ | (2) |
| $|B4T| < 0.35$ | (3) |
| $-0.25 < |B4W| - |B4T| < 0.25$ | (4) |
| $|f4 / f1\text{-}3W| < 0.4$ | (5) |
| $|f4 / F1\text{-}3T| < 0.25$ | (6) | where

X4: the moving quantity of the fourth lens unit with respect to the image plane when performing the zooming from the wide-angle end to the telephoto end, f4: the focal length of the fourth lens unit, B4W: the image forming magnification of the fourth lens unit at the wide-angle end, B4T: the image forming magnification of the fourth lens unit at the telephoto end, f1-3W: the combined focal length from the first lens unit to the third lens unit at the wide-angle end, and f1-3T: the combined focal length from the first lens unit to the third lens unit at the telephoto end.

The condition (1) prescribes the moving quantity of the fourth lens unit when effecting the zooming. Over an upper limit of the condition (1), there is undesirable increase in the variations in the focusing moving quantities of the second and third lens units due to the focal length. Whereas under a lower limit of the condition (1), a positional shift of the fourth lens unit decreases, resulting in difficulty in attaining the down-sizing and the higher zoom ratio of the zoom lens.

The condition (2) prescribes the image forming magnification of the fourth lens unit at the wide-angle end. Over an upper limit of the condition (2), there undesirable increase in a difference in the focusing moving quantity between the wide-angle end and the telephoto end.

The condition (3) prescribes the image forming magnification of the fourth lens unit at the telephoto end. Over an upper limit of the condition (3), there is an undesirable increase in a difference in the focusing moving quantity between the wide-angle end and the telephoto end.

The condition (4) prescribes a difference in terms of an absolute value of the image forming magnification of the fourth lens unit between the wide-angle end and the telephoto end. Beyond any one of the upper and lower limits of the condition (4), the difference in the focusing moving quantity between the wide-angle end and the telephoto end undesirably increases.

The condition (5) prescribes the combined focal length from the first lens unit to the third lens unit at the wide-angle end. Over an upper limit of the condition (5), there is an undesirable increase in the difference in the focusing moving quantity between the wide-angle end and the telephoto end.

The condition (6) prescribes the combined focal length from the first lens unit to the third lens unit at the telephoto end. Over an upper limit of the condition (6), the difference in the focusing moving quantity between the wide-angle end and the telephoto end undesirably increases.

A zoom lens according to a second aspect of the present invention comprises, sequentially from an object side, a first lens unit exhibiting a positive refracting power, a second lens unit exhibiting a negative refracting power, a third lens unit exhibiting a positive refracting power and a fourth lens unit exhibiting a positive refracting power. The zooming from the wide-angle end to the telephoto end is carried out by changing an air spacing between the first lens unit and the second lens unit, an air spacing between the second lens unit and the third lens unit and an air spacing between the third lens unit and the fourth lens unit. The zoom lens is constructed to perform the focusing from the long distance object to the short distance object by integrally moving the second lens unit and the third lens unit toward the image side.

Based on the above construction, it is desirable to satisfy at least one of the following constructions.

A desirable construction is that the fourth lens unit moves toward the object side when effecting the zooming from the wide-angle end to the telephoto end.

Another desirable construction is that the first lens unit moves toward the object side when performing the zooming from the wide-angle end to the telephoto end.

Still another desirable construction is that when executing the zooming from the wide-angle end to the telephoto end, the air spacing between the first lens unit and the second lens unit is extended, while the air spacing between the second lens unit and the third lens unit is reduced.

A further desirable construction is that the air spacing between the third lens unit and the fourth lens unit at the wide-angle end is larger than the air spacing between the third lens unit and the fourth lens unit at the telephoto end.

It is desirable that the zoom lens be constructed to satisfy the following condition:

$$0.05 < X4 / f4 < 0.50$$

where X4 is the moving quantity of the fourth lens unit with respect to the image plane when effecting the zooming from the wide-angle end to the telephoto end, and f4 is the focal length of the fourth lens unit.

It is also desirable that the zoom lens be constructed to satisfy the following conditions:

$$|B4W| < 0.4$$

$$|B4T| < 0.4$$

where B4W is the image forming magnification of the fourth lens unit at the wide-angle end, and B4T is the image forming magnification of the fourth lens unit at the telephoto end.

It is further desirable that the zoom lens be constructed to satisfy the following condition:

$$-0.3 < |B4W| - |B4T| < 0.3$$

where B4W is the image forming magnification of the fourth lens unit at the wide-angle end, and B4T is the image forming magnification of the fourth lens unit at the telephoto end.

It is desirable that the zoom lens be constructed to satisfy the following conditions:

$$|f4 / f1-3W| < 0.4$$

$$|f4 / f1-3T| < 0.4$$

where f4 is the focal length of the fourth lens unit, f1-3W is the combined focal length from the first lens unit to the third lens unit at the wide-angle end, and f1-3T is the combined focal length distance from the first lens unit to the third lens unit at the telephoto end.

It is desirable that the zoom lens be constructed to satisfy the following conditions:

$$f1-3W / fW > 4$$

$$f1-3T / fW < -4$$

where fW is the focal length of the zoom lens at the wide-angle end, f1-3W is the combined focal length from the first lens unit to the third lens unit at the wide-angle end, and f1-3T is the combined focal length from the first lens unit to the third lens unit at the telephoto end.

Generally, in the zoom lens including the first positive lens unit, the second negative lens unit, the third positive lens unit and the fourth positive lens unit, lens diameters of the second and third lens units are smaller than that of the first lens unit, and moving the second or third lens unit is desirable because of the smaller load on the motor when performing the autofocusing.

When executing the focusing by moving only the second lens unit, however, the focusing moving quantity with respect to the same photographing distance largely changes depending on the focal length. Further, for certain focal lengths, when the image forming magnification of the second lens unit is −1, focusing is impossible.

Further, even when the focusing is carried out by moving only the third lens unit, the focusing moving quantity with respect to the same photographing distance largely varies depending on the focal length.

Thus, according to a second aspect of the present invention, the focusing is effected by moving the second and third lens units together. The variations in the focusing moving quantity, with respect to the same photographing distance, due to changes in the focal length can be thereby made smaller than in the two cases given above. In this situation, it is desirable that the on-axis light beam passing between the third lens unit and the fourth lens unit be approximate to the afocal state.

If the on-axis light beam traveling between the third and fourth lens units is completely afocal at all times over a range from the wide-angle end to the telephoto end, it follows that the focusing performed by integrally moving the second and third lens units toward the image side is substantially the same as the focusing effected by moving the first lens unit toward the object side, and the focusing moving quantity is fixed without depending on the focal length. In this case, however, the position of the fourth lens unit does not shift even when performing the zooming. Further, the fourth lens unit does not have the zooming function. It is therefore difficult to attain the down-sizing and the higher zoom ratio of the zoom lens.

Thus, the desirable construction is that the on-axis light beam passing between the third lens unit and the fourth lens unit is a weak converging light beam at the wide-angle end and a weak diverging light beam at the telephoto end. In this situation, when performing the zooming from the wide-angle to the telephoto end, a desirable construction is that the fourth lens unit moves toward the object. For attaining such a construction, when effecting the zooming from the wide-angle end to the telephoto end, it is desirable that the air spacing between the first and second lens unit be extended, the air spacing between the second and third lens units be reduced and the air spacing between the third and fourth lens units be varied.

Furthermore, in the above construction, the focusing is conducted by moving the second and third lens units together, and, for the purpose of decreasing the variations in the focusing moving quantity with respect to the same photographing distance due to the focal length, it is desirable to satisfy any one of the following conditions (7) through (12).

$$0.05 < X4 / f4 < 0.50 \quad (7)$$

$$|\beta 4W| < 0.4 \quad (8)$$

$$|\beta 4T| < 0.4 \quad (9)$$

$$-0.3 < |\beta 4W| - |\beta 4T| < 0.3 \quad (10)$$

$$|f4 / f1\text{-}3W| < 0.4 \quad (11)$$

$$|f4 / f1\text{-}3T| < 0.4 \quad (12)$$

The condition (7) prescribes the moving quantity of the fourth lens unit when effecting the zooming. Over an upper limit of the condition (7), there is an undesirable increase in the variations in the focusing moving quantities of the second and third lens units due to the focal length. Whereas under a lower limit of the condition (7), a positional shift of the fourth lens unit decreases, resulting in difficulty in attaining the down-sizing and the higher zoom ratio of the zoom lens.

The condition (8) prescribes the image forming magnification of the fourth lens unit at the wide-angle end. Over an upper limit of the condition (8), there is an undesirable increase in a difference in the focusing moving quantity between the wide-angle end and the telephoto end.

The condition (9) prescribes the image forming magnification of the fourth lens unit at the telephoto end. Over an upper limit of the condition (9), there is an undesirable increase in a difference in the focusing moving quantity between the wide-angle end and the telephoto end.

The condition (10) prescribes a difference in terms of an absolute value of the image forming magnification of the fourth lens unit between the wide-angle end and the telephoto end. Beyond any one of the upper and lower limits of the condition (10), the difference in the focusing moving quantity between the wide-angle end and the telephoto end undesirably increases.

The condition (11) prescribes the combined focal length from the first lens unit to the third lens unit at the wide-angle end. Over an upper limit of the condition (11), there is an undesirable increase in the difference in the focusing moving quantity between the wide-angle end and the telephoto end.

The condition (12) prescribes the combined focal length from the first lens unit to the third lens unit at the telephoto end. Over an upper limit of the condition (12), the difference in the focusing moving quantity between the wide-angle end and the telephoto end undesirably increases.

It is also desirable that at least one of the following conditions (13) and (14) be satisfied:

$$f1\text{-}3W / fW > 4 \quad (13)$$

$$f1\text{-}3T / fW < -4 \quad (14)$$

where fW: the focal length of the zoom lens at the wide-angle end.

When deviating from any one of the ranges of the conditions (13) and (14), the difference in the focusing moving quantity between the wide-angle end and the telephoto end undesirably increases.

A zoom lens according to a third aspect of the present invention includes a front lens unit disposed closest to the object side and exhibiting a positive refracting power, a rear lens unit disposed closest to the image side and an intermediate lens unit disposed therebetween. When effecting the zooming, the front and rear lens units move together in the optical-axis direction, and, when performing the focusing, the intermediate lens unit moves integrally. In this situation, the front and rear lens units are static, whereas at least one air spacing within the intermediate lens unit is variable during the zooming.

Note that the same focusing system as the present invention can be, as a matter of course, attained even by dividing the first lens unit into two or more lens subunits and changing the mutual spacing therebetween when conducting the zooming. Further, this is the same with each of the second, third and fourth lens units.

Moreover, the same focusing system as the present invention can be, as a matter of course, attained even by adding the fifth lens unit on the image side of the fourth lens unit.

The above and other objects, features and advantages of the present invention are explained hereinafter and may be better understood by reference to the drawings and the descriptive matter which follows.

DETAILED DESCRIPTION OF THE PREFERRED EMBODIMENTS

Embodiments of the present invention will hereinafter be discussed with reference to the accompanying drawings.

[Embodiment 1]

Figure 1:
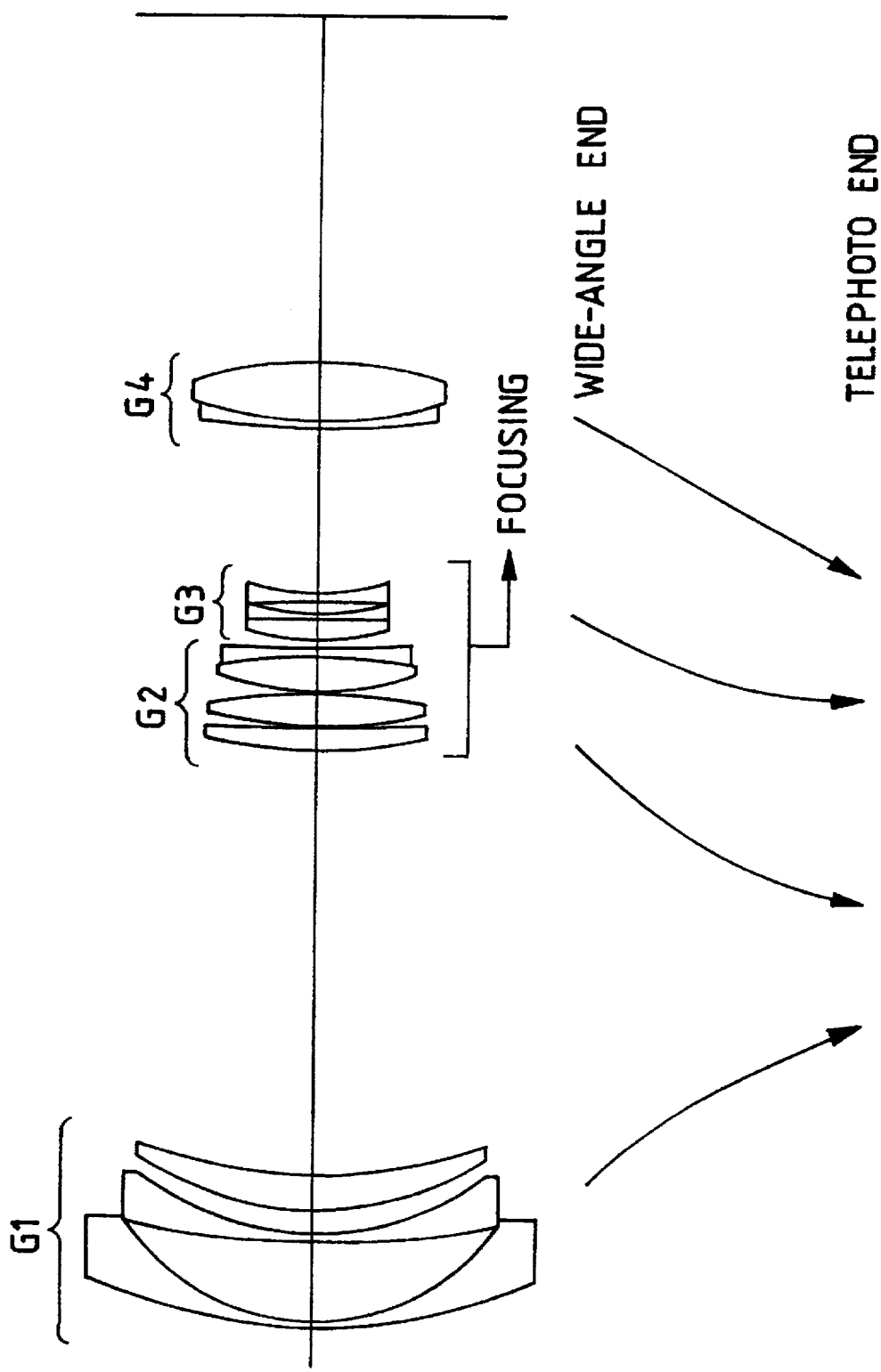
FIG. 1 is a view illustrating a lens layout in an embodiment 1 of the present invention.

An inner focus zoom lens in an embodiment 1 is, as illustrated in FIG. 1, constructed of a first negative lens unit G1, a second positive lens unit G2, a third negative lens unit G3 and a fourth positive lens unit G4. When performing a zoom from a wide-angle end to a telephoto end, a spacing between the first lens unit G1 and the second lens unit G2 is reduced; a spacing between the second lens unit G2 and the third lens unit G3 is extended; and a spacing between the third lens unit G3 and the fourth lens unit G4 is reduced. In this situation, the fourth lens unit G4 moves toward an object side. When effecting focusing from a long distance object to a short distance object, the second lens unit G2 and the third lens unit G3 move together toward an image side.

The first negative lens unit G1 is composed of, sequentially from an object side, a negative meniscus lens with its convex surface toward the object side, a negative meniscus lens and a positive meniscus lens. The second positive lens unit G2 is composed of, sequentially from the object side, a positive meniscus lens, a biconvex positive lens and a cemented lens of a biconvex positive lens and a negative lens. The third negative lens unit G3 is composed of, sequentially from the object side, a cemented lens of a positive lens and a negative lens, and negative meniscus lens. The fourth positive lens unit G4 is composed of, sequentially from the object side, a cemented lens of a negative lens and a biconvex positive lens.

Table 1 shows values of data and condition corresponding numerical values in an embodiment 1 of the present invention.

In the following Tables, f designates the focal length, F represents the F-number, and 2ω denotes the view angle. The numeral at the left end represents the order from the object side, r is the radius of curvature of a lens surface, d is the inter-lens-surface spacing, and n and v are the values of the refractive index and the Abbe number, respectively with respect to d-line (wavelength λ=587.6 nm). Further, the surface indicated by the numeral marked with [*] at the left end is aspherical. The aspherical surface is expressed as follows:

$$A(h)=(h^2/r)/[1+(1-kh^2/r^2)^{1/2}]+C4h^4+C6h^6+C8h^8+C10h^{10}$$

where A(h) is the distance from a tangential plane of the vertex of the aspherical surface in the optical-axis direction at the height h from the optical axis in the perpendicular direction, r is the paraxial curvature radius, k is the conical constant, and Cn is the nth-order aspherical surface coefficient. Further, in Tables showing focusing movement quantities, R is the photographing distance, FW, FM and FT respectively designate the focusing moving quantities of the second and third lens units at the wide-angle end, the intermediate focal length and the telephoto end. Also, the Tables of image surface deviation quantity show the image surface deviation quantities at the respective focal lengths when giving the focusing moving quantity at the telephoto end, wherein R is the photographing distance, F is the focusing moving quantity, ΔW, ΔM and ΔT individually represent the image surface deviation quantities at the wide-angle end, the intermediate focal length and the telephoto end. Note that the positive sign of the image surface deviation quantity indicates a back-focal-length increasing direction, while the negative sign indicates a back-focal-length decreasing direction.

TABLE 1

Values of Data in the Embodiment 1

| f = 28.80–82.50 | | F = 3.71–4.90 | 2ω = 77.3–28.5° | |
|---|---|---|---|---|
| | r | d | v | n |
| 1 | 61.0224 | 1.0000 | 46.53 | 1.80411 |
| 2 | 25.8275 | 9.5991 | | |
| 3* | 179.6222 | 1.0000 | 70.45 | 1.48749 |
| 4 | 32.4922 | 2.8439 | | |
| 5 | 34.3796 | 4.3782 | 23.01 | 1.86074 |
| 6 | 53.2985 | (d6) | | |
| 7 | 49.2121 | 2.8044 | 70.45 | 1.48749 |
| 8 | 354.5410 | 0.1000 | | |
| 9 | 48.1226 | 4.2785 | 70.45 | 1.48749 |
| 10 | −62.2580 | 0.1000 | | |
| 11 | 33.8694 | 4.5046 | 70.45 | 1.48749 |
| 12 | −56.7505 | 1.0000 | 23.01 | 1.86074 |
| 13 | 257.2868 | (d13) | | |
| 14 | (stop) | 0.6000 | | |
| 15 | 32.9818 | 2.2820 | 23.01 | 1.86074 |
| 16 | 371.7484 | 1.0000 | 40.75 | 1.58144 |
| 17 | 27.7177 | 1.3386 | | |
| 18 | 114.6883 | 1.0000 | 39.61 | 1.80454 |
| 19 | 25.2292 | (d19) | | |
| 20* | 74.2932 | 1.0000 | 23.01 | 1.86074 |
| 21 | 41.2352 | 7.5636 | 57.03 | 1.62280 |
| 22 | −44.8827 | (Bf) | | |

An aspherical configuration of the 3rd surface has the following characteristics.

$k=1.000$ $C4=0.2596\times10^{-5}$ $C6=0.2166\times10^{-8}$ $C8=-0.4935\times10^{-11}$
$C10=0.1401\times10^{-13}$ As aspherical configuration of the 20th surface has the following characteristics.

$k=1.000$ $C4=-0.2644\times10^{-5}$ $C6=0.2816\times10^{-8}$ $C8=-0.1579\times10^{-11}$
$C10=-0.3620\times10^{-14}$ The following are changes in the spacing during zooming.

| f   | 28.7984 | 50.0048 | 82.4996 |
|-----|---------|---------|---------|
| d6  | 53.2968 | 17.5403 | 1.0000  |
| d13 | 0.5000  | 5.7138  | 12.3317 |
| d19 | 20.4000 | 16.9199 | 4.0561  |
| Bf  | 42.6975 | 52.7059 | 65.8936 |

The focusing movement quantities are as follows.

| R     | FW     | FM     | FT     |
|-------|--------|--------|--------|
| ∞     | 0.0000 | 0.0000 | 0.0000 |
| 10000 | 0.2443 | 0.2303 | 0.2369 |
| 5000  | 0.4943 | 0.4648 | 0.4775 |
| 3000  | 0.8368 | 0.7842 | 0.8045 |
| 2000  | 1.2803 | 1.1945 | 1.2232 |
| 1500  | 1.7420 | 1.6177 | 1.6536 |
| 1200  | 2.2229 | 2.0544 | 2.0961 |
| 1000  | 2.7243 | 2.5053 | 2.5512 |

Image Surface Deviation Quantities

| R     | F      | ΔW     | ΔM      | ΔT     |
|-------|--------|--------|---------|--------|
| ∞     | 0.0000 | 0.0000 | 0.0000  | 0.0000 |
| 10000 | 0.2369 | 0.0025 | −0.0072 | 0.0000 |
| 5000  | 0.4775 | 0.0057 | −0.0139 | 0.0000 |
| 3000  | 0.8045 | 0.0110 | −0.0223 | 0.0000 |
| 2000  | 1.2232 | 0.0194 | −0.0316 | 0.0000 |
| 1500  | 1.6536 | 0.0300 | −0.0416 | 0.0000 |
| 1200  | 2.0961 | 0.0429 | −0.0459 | 0.0000 |
| 1000  | 2.5512 | 0.0585 | −0.0506 | 0.0000 |

Condition Corresponding Numerical Values

X4 / f4=0.447 (1)

|B4W|=0.144 (2)

|B4T|=0.303 (3)

|B4W|−|B4T|=−0.159 (4)

|f4| / f1−3W|=0.260 (5)

|f4| / f1−3T|=0.191 (6)

Figure 2:
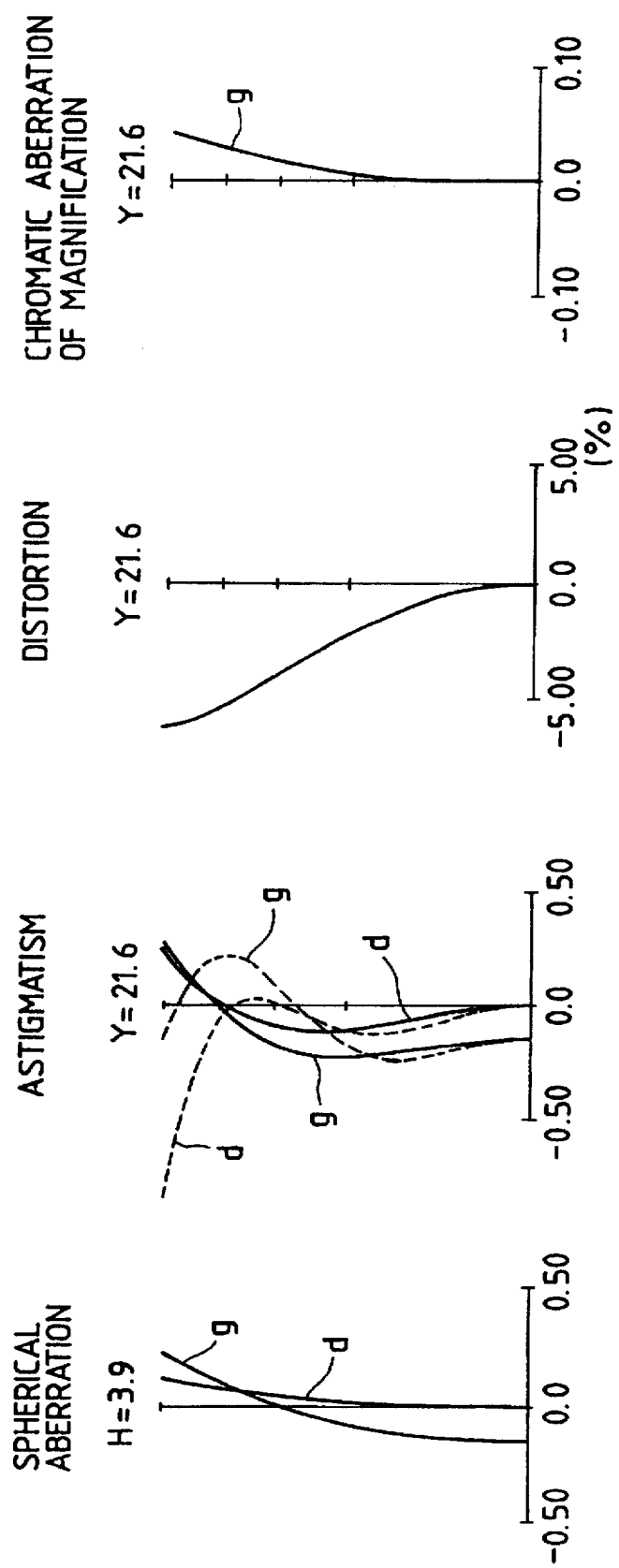
FIG. 2 is a diagram showing various aberrations at a wide-angle end in the embodiment 1 of the present invention.
Figure 3:
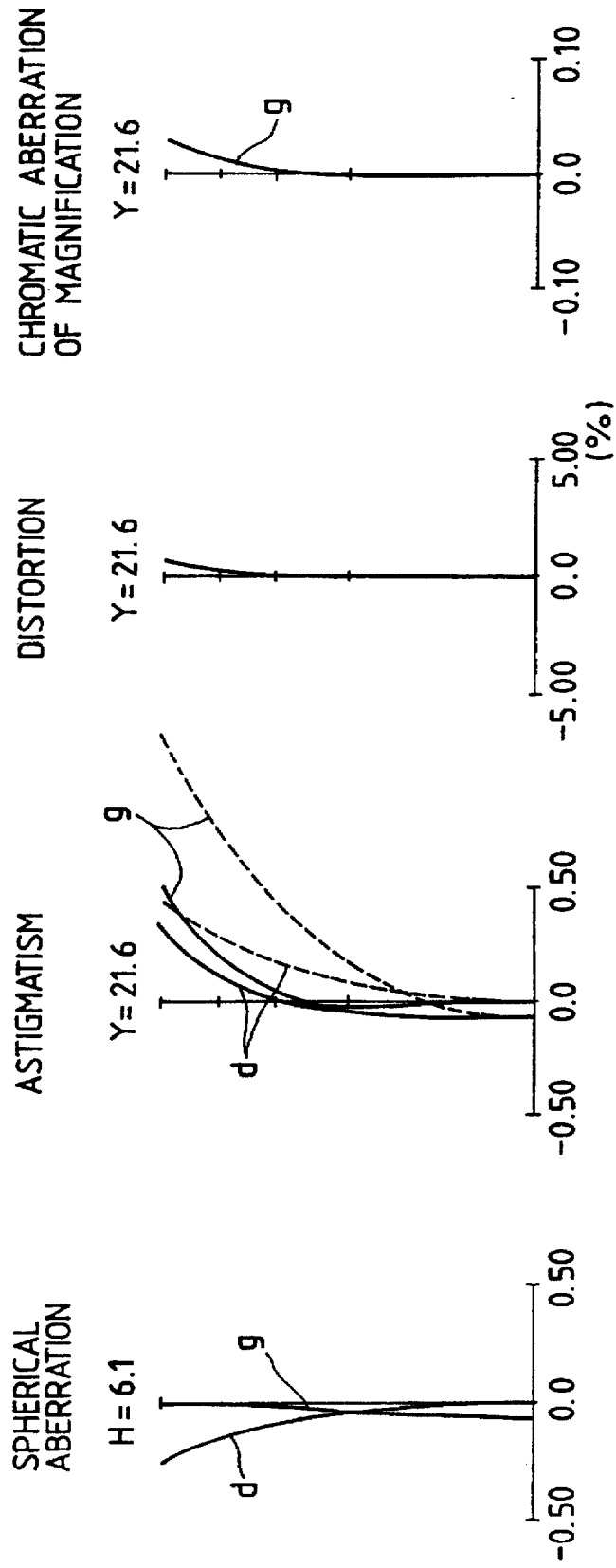
FIG. 3 is a diagram showing the various aberrations in a state of an intermediate focal length in the embodiment 1 of the present invention.
Figure 4:
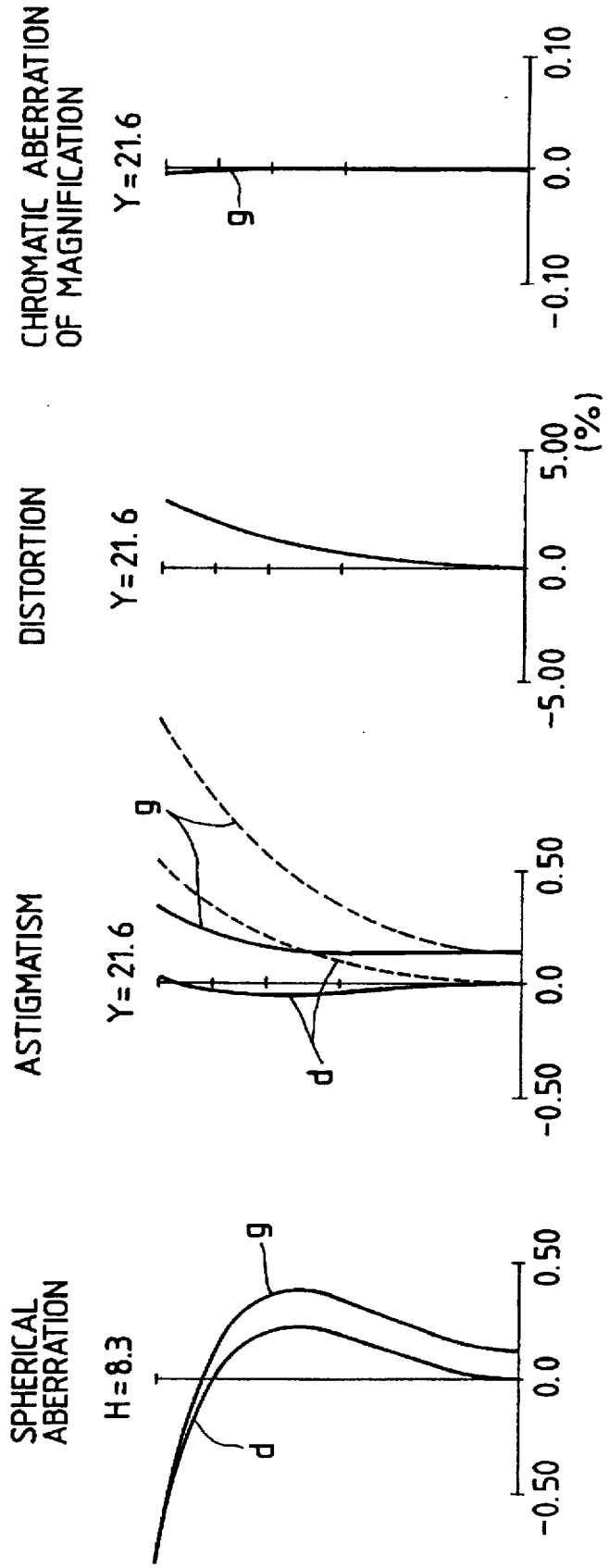
FIG. 4 is a diagram showing the various aberrations at a telephoto end in the embodiment 1 of the present invention.

FIG. 2 is a diagram illustrating various aberrations at the wide-angle end in the embodiment 1. FIG. 3 is a diagram showing the various aberrations at the intermediate focal length in the embodiment 1. FIG. 4 is a diagram showing the various aberrations at the telephoto end in the embodiment 1. In these diagrams of the aberrations, H represents the height of the incident light beam, Y designates the image height, d denotes d-line ($\lambda$=587.6 nm), and g represents g-line ($\lambda$=435.8 nm). In the diagram showing an astigmatism, the dotted line indicates the meridional image surface, while the solid line indicates the sagittal image surface.

It is obvious from each aberration diagram that the various aberrations are well corrected, and excellent image forming performance is exhibited in the embodiment of the present invention.

Further, it can be known from the Table showing the image surface deviation quantity that the image surface deviation is very small even when effecting the focusing at other focal lengths by use of the focusing moving quantity at the telephoto end, and the focusing moving quantity can be substantially fixed without depending on the focal length.

[Embodiment 2]

Figure 5:
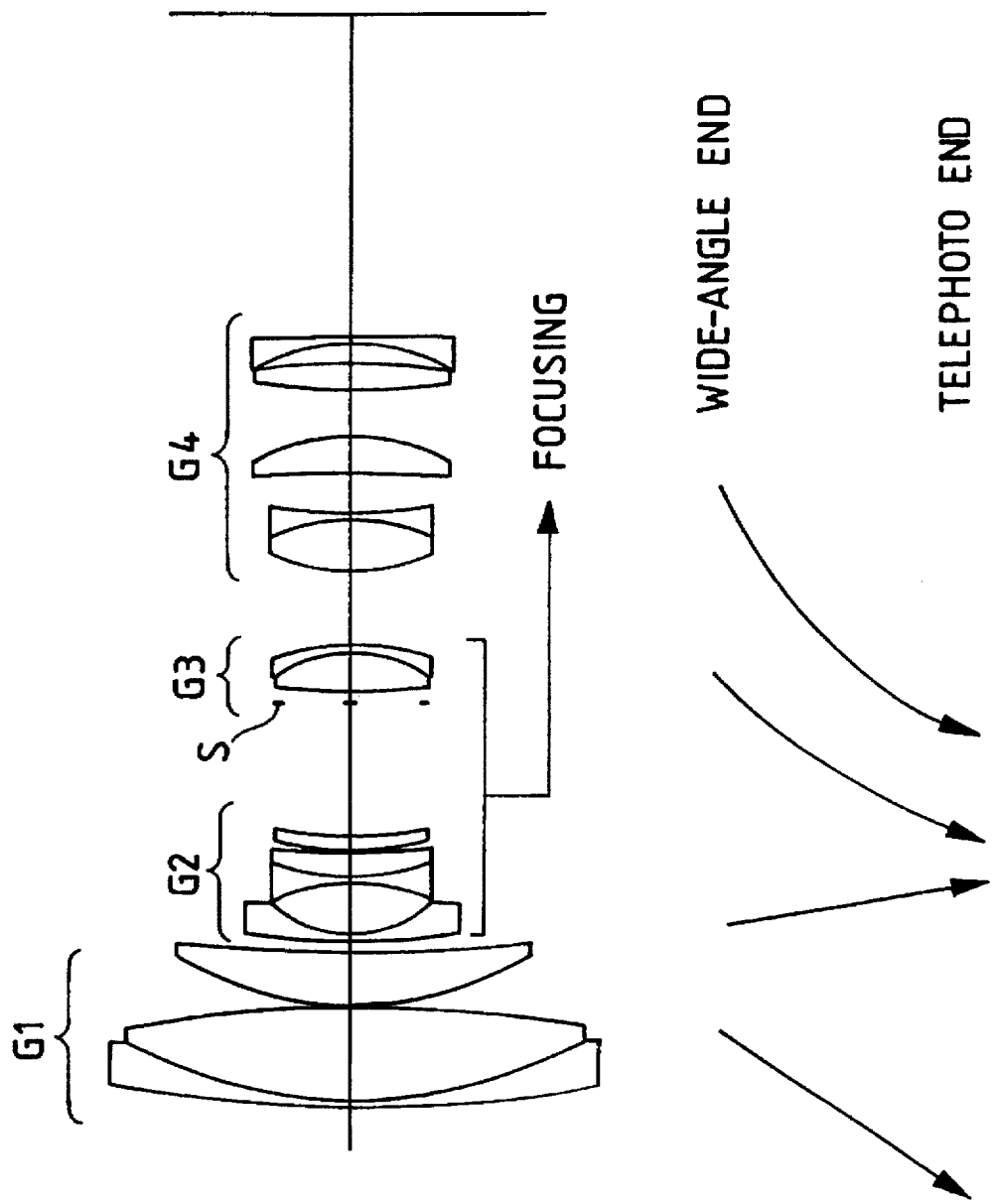
FIG. 5 is a view illustrating a lens layout in an embodiment 2 of the present invention.

The inner focus zoom lens in an embodiment 2 is, as illustrated in FIG. 5, constructed of a first positive lens unit G1, a second negative lens unit G2, a third positive lens unit G3 and a fourth positive lens unit G4. When performing the zoom from the wide-angle end to the telephoto end, the spacing between the first lens unit G1 and the second lens unit G2 is extended; the spacing between the second lens unit G2 and the third lens unit G3 is reduced; and the spacing between the third lens unit G3 and the fourth lens unit G4 is reduced. In this situation, the fourth lens unit G4 moves in the object side. When effecting the focusing from the long distance object to the short distance object, the second lens unit G2 and the third lens unit G3 move together toward the image side.

The first positive lens unit G1 is composed of, sequentially from the object side, a positive cemented lens of a negative meniscus lens with its convex surface toward the object side, and a biconvex lens and a positive lens with its strong convex surface toward the object side. The second negative lens unit G2 is composed of, sequentially from the object side, a negative meniscus lens, a cemented lens of a negative biconcave lens and a positive lens and a positive lens. The third positive lens unit G3 is composed of, sequentially from the object side, a stop S and a cemented lens of a positive lens and a negative lens with its concave surface toward the object side. The fourth positive lens unit G4 is composed of, sequentially from the object side, a cemented lens of a positive lens and a negative lens with its concave surface toward the object side, a positive lens with its strong convex surface toward an image side, a positive lens and a negative lens.

Table 2 shows values of data and condition corresponding numerical values in an embodiment 2 of the present invention.

TABLE 2

| Values of Data in the Embodiment 2 | | | |
|---|---|---|---|
| f = 36.10–103.00 | F = 3.66–4.46 | 2ω = 64.5–22.6° | |
| r | d | ν | n |
| 1    144.1924 | 1.0000  | 23.00 | 1.86074 |
| 2     54.3963 | 11.5202 | 64.12 | 1.51680 |
| 3   −165.3482 | .1000   |       |         |
| 4     39.7230 | 6.4209  | 52.28 | 1.74810 |
| 5    169.1827 | d5      |       |         |
| 6*    65.9992 | 1.0000  | 57.53 | 1.67025 |
| 7     14.4456 | 6.1988  |       |         |
| 8    −24.7662 | 1.0000  | 52.28 | 1.74810 |
| 9     26.6687 | 3.0582  | 23.00 | 1.86074 |
| 10   190.9738 | .1000   |       |         |
| 11    33.0077 | 2.0674  | 25.49 | 1.80458 |
| 12    52.6947 | d12     |       |         |
| 13    (stop)  | 1.2500  |       |         |
| 14    68.5433 | 4.8847  | 60.27 | 1.51835 |
| 15   −15.2964 | 1.0000  | 33.89 | 1.80384 |
| 16   −25.8558 | d16     |       |         |
| 17    22.3551 | 6.4273  | 56.46 | 1.50137 |
| 18   −21.9904 | 1.0000  | 40.90 | 1.79631 |
| 19    64.7555 | 4.9635  |       |         |
| 20  −173.1803 | 4.2913  | 50.84 | 1.65844 |
| 21   −23.3359 | 5.7549  |       |         |
| 22    69.0170 | 3.5924  | 60.12 | 1.62041 |
| 23   −57.0732 | 2.2037  |       |         |
| 24   −21.3551 | 1.0000  | 40.90 | 1.79631 |
| 25  −207.7394 | Bf      |       |         |

An aspherical configuration of the 6th surface has the following characteristics.

$k$=1.000 $C4$=−0.5156×10$^{-5}$ $C6$=0.9915×10$^{-8}$ $C8$=−0.1265×10$^{-9}$ $C10=0.2738\times10^{-12}$ The following are changes in the spacing during zooming.

| f | 36.1002 | 61.9996 | 102.9987 |
|---|---------|---------|----------|
| d5 | 1.5000 | 9.3069 | 17.4721 |
| d12 | 16.3678 | 8.3813 | 1.2000 |
| d16 | 9.2981 | 3.7667 | 3.9133 |
| Bf | 40.1275 | 50.7846 | 55.2833 |

The focusing movement quantities are as follows.

| R | FW | FM | FT |
|---|------|------|------|
| ∞ | 0.0000 | 0.0000 | 0.0000 |
| 10000 | 0.3324 | 0.3357 | 0.3353 |
| 5000 | 0.6776 | 0.6847 | 0.6843 |
| 3000 | 1.1592 | 1.1721 | 1.1725 |
| 2000 | 1.7982 | 1.8199 | 1.8226 |
| 1500 | 2.4824 | 2.5150 | 2.5216 |
| 1300 | 2.9280 | 2.9684 | 2.9785 |

Image Surface Deviation Quantities

| R | F | ΔW | ΔM | ΔT |
|---|------|------|------|------|
| ∞ | 0.0000 | 0.0000 | 0.0000 | 0.0000 |
| 10000 | 0.3353 | −0.0011 | 0.0005 | 0.0000 |
| 5000 | 0.6843 | −0.0026 | 0.0005 | 0.0000 |
| 3000 | 1.1725 | −0.0053 | −0.0004 | 0.0000 |
| 2000 | 1.8226 | −0.0097 | −0.0031 | 0.0000 |
| 1500 | 2.5216 | −0.0156 | −0.0078 | 0.0000 |
| 1300 | 2.9785 | −0.0201 | −0.0119 | 0.0000 |

Condition Corresponding Numerical Values

X4 / f4=0.227  (7)

IB4WI=0.037  (8)

IB4TI=0.190  (9)

IB4WI−IB4TI=−0.153  (10)

If4 / f1-3WI=0.069  (11)

f4 / f1-3T −0.123  (12)

f1-3W / fW=27.03  (13)

f1-3T / fW=−15.32  (14)

Figure 6:
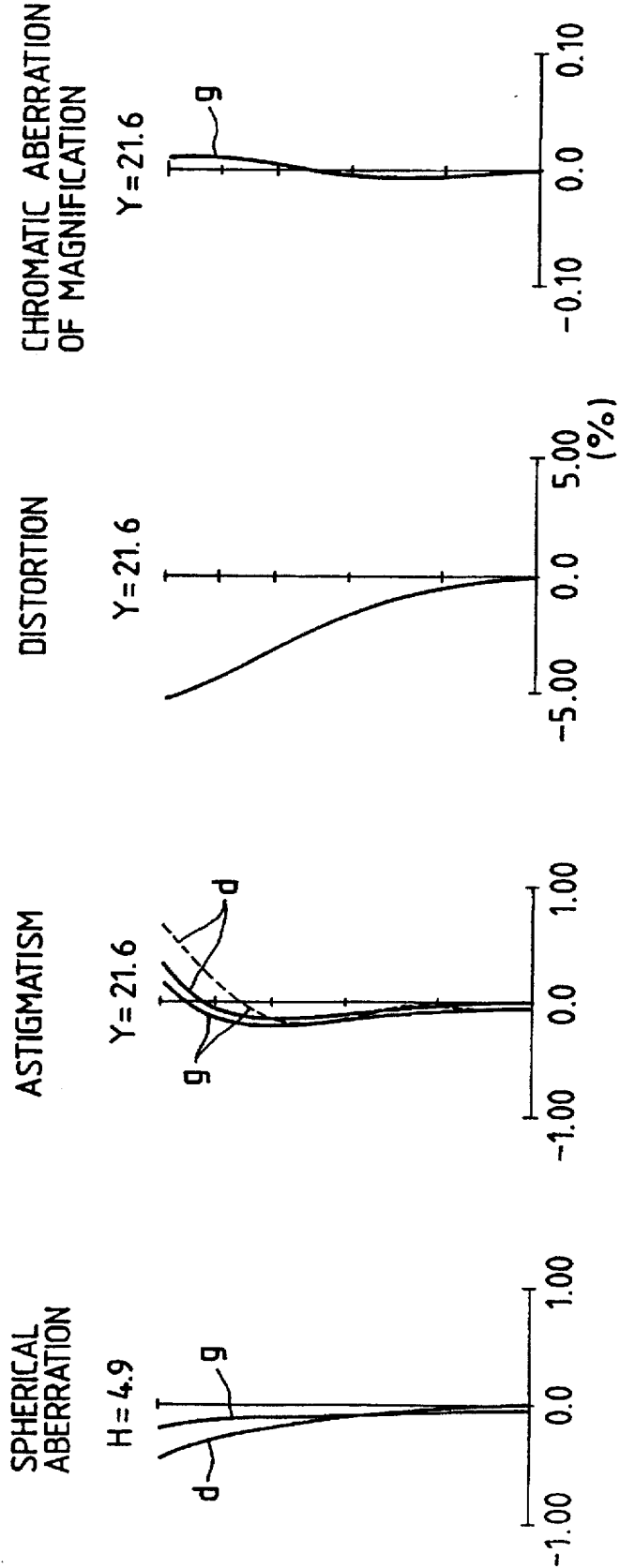
FIG. 6 is a diagram showing various aberrations at the wide-angle end in the embodiment 2 of the present invention.
Figure 7:
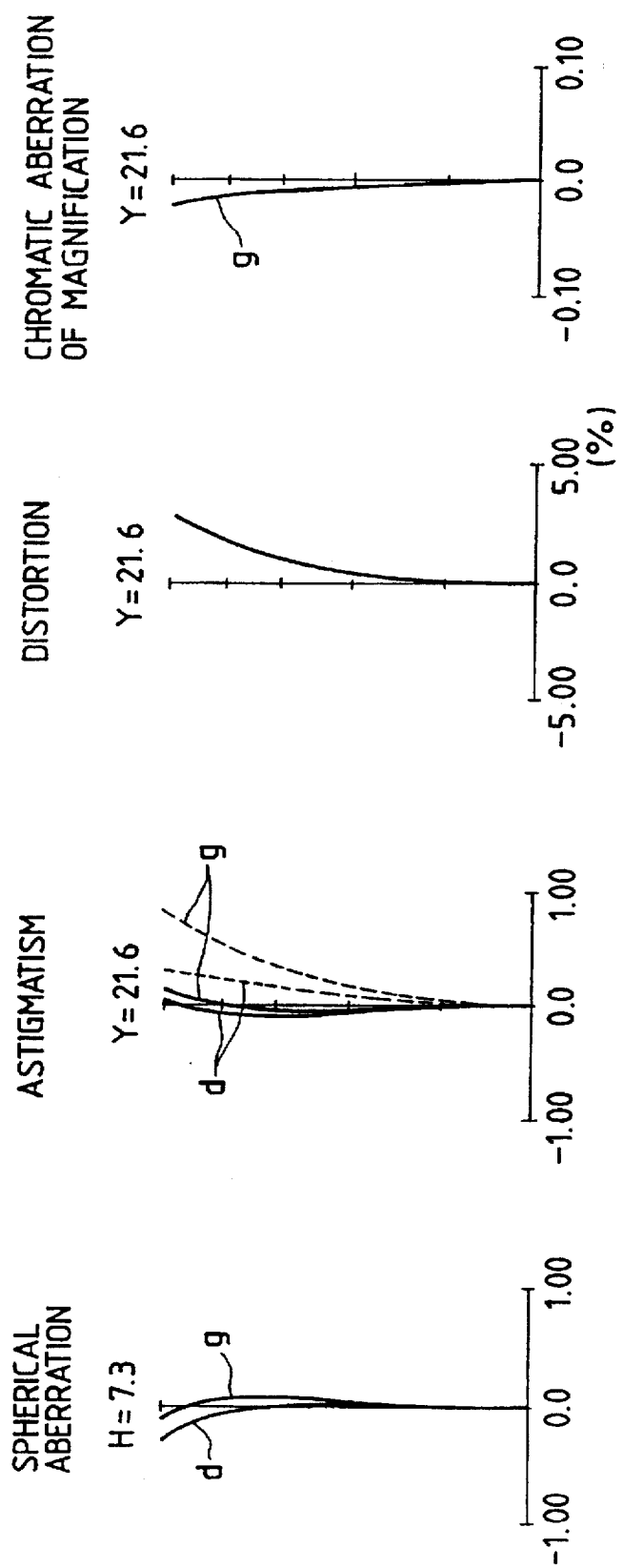
FIG. 7 is a diagram showing the various aberrations in the state of the intermediate focal length in the embodiment 2 of the present invention.
Figure 8:
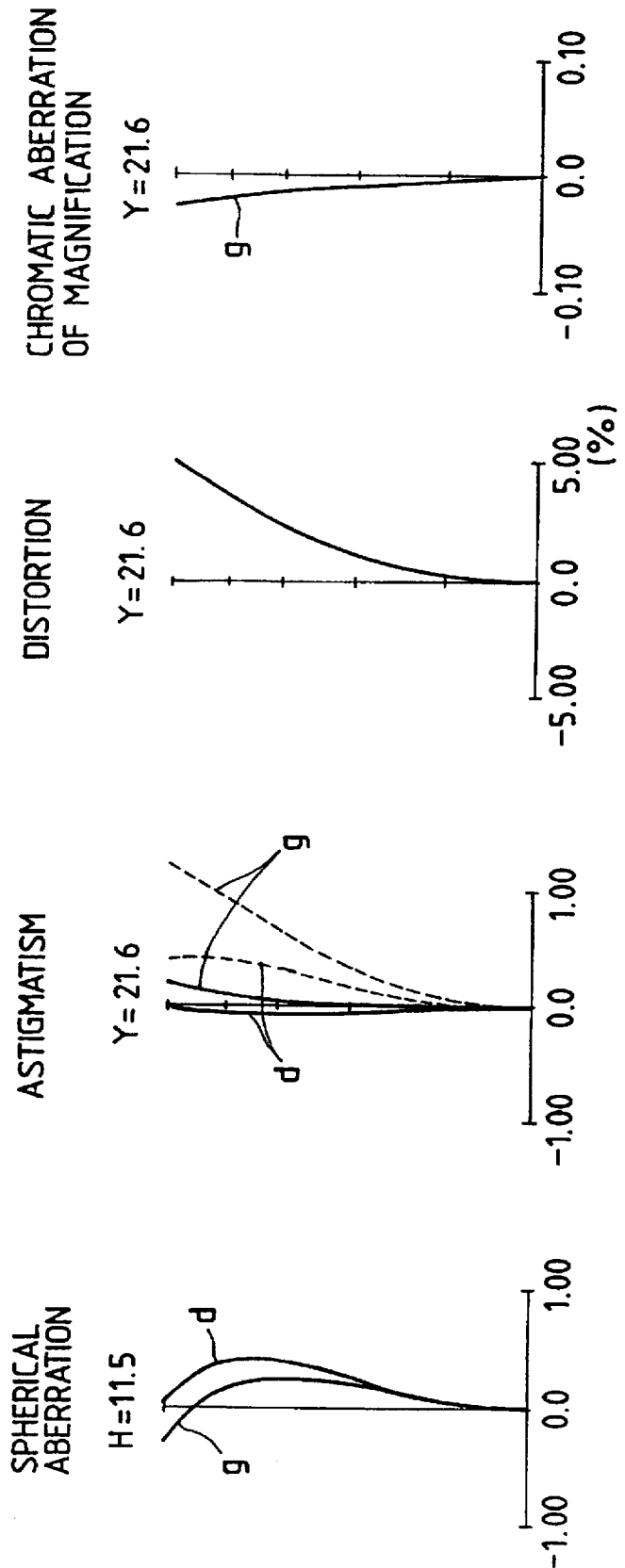
FIG. 8 is a diagram showing the various aberrations at the telephoto end in the embodiment 2 of the present invention.

FIG. 6 is a diagram illustrating various aberrations at the wide-angle end in the embodiment 2. FIG. 7 is a diagram showing the various aberrations at the intermediate focal length in the embodiment 2. FIG. 8 is a diagram showing the various aberrations at the telephoto end in the embodiment 2.

It is obvious from each aberration diagram that the various aberrations are well corrected, and excellent image forming performance is exhibited in the embodiment of the present invention.

Further, it can be known from the Table showing the focusing moving quantity that the focusing moving quantity at each focal length with respect to the same photographing distance is substantially fixed. It can be also known from the Table showing the image surface deviation quantity that the image surface deviation is very small even when effecting the focusing at other focal lengths by use of the focusing moving quantity at the telephoto end, and the focusing moving quantity can be substantially fixed without depending on the focal length.

Having described preferred embodiments of the present invention, it is to be understood that variations will occur to those skilled in the art within the scope of the appended claims.

What is claimed is:

1. An inner focus zoom lens comprising, sequentially from an object side:

a first lens unit exhibiting a negative refracting power;

a second lens unit exhibiting a positive refracting power;

a third lens unit exhibiting a negative refracting power; and a fourth lens unit exhibiting a positive refracting power, wherein, when effecting zooming from a wide-angle end to a telephoto end, said fourth lens unit is moved toward said object side, an air spacing between said first lens unit and said second lens unit is reduced, an air spacing between said second lens unit and said third lens unit is extended, and an air spacing between said third lens unit and said fourth lens unit is reduced, focusing from a long distance object to a short distance object is performed by integrally moving said second lens unit and said third lens unit toward an image side, and said inner focus zoom lens satisfies the following condition:

0.1<X4 / f4=0.47 where X4 is the moving quantity of said fourth lens unit with respect to the image plane when effecting zooming from the wide-angle end to the telephoto end, and f4 is the focal length of said fourth lens unit.

2. An inner focus zoom lens comprising, sequentially from an object side:

a first lens unit exhibiting a negative refracting power;

a second lens unit exhibiting a positive refracting power;

a third lens unit exhibiting a negative refracting power; and a fourth lens unit exhibiting a positive refracting power, wherein, when effecting zooming from a wide-angle end to a telephoto end, said fourth lens unit is moved toward said object side, an air spacing between said first lens unit and said second lens unit is reduced, an air spacing between said second lens unit and said third lens unit is extended, and an air spacing between said third lens unit and said fourth lens unit is reduced, focusing from a long distance object to a short distance object is performed by integrally moving said second lens unit and said third lens unit toward an image side, and said inner focus zoom lens satisfies the following conditions:

IB4WI<0.35

IB4TI<0.35 where B4W is the image forming magnification of said fourth lens unit at the wide-angle end, and B4T is the image forming magnification of said fourth lens unit at the telephoto end.

3. An inner focus zoom lens comprising, sequentially from an object side:

a first lens unit exhibiting a negative refracting power;

a second lens unit exhibiting a positive refracting power;

a third lens unit exhibiting a negative refracting power; and a fourth lens unit exhibiting a positive refracting power, wherein, when effecting zooming from a wide-angle end to a telephoto end, said fourth lens unit is moved toward said object side, an air spacing between said first lens unit and said second lens unit is reduced, an air spacing between said second lens unit and said third lens unit is extended, and an air spacing between said third lens unit and said fourth lens unit is reduced, focusing from a long distance object to a short distance object is performed by integrally moving said second lens unit and said third lens unit toward an image side, and said inner focus zoom lens satisfies the following condition:

$$-0.25 < |B4W| - |B4T| < 0.25$$

where B4W is the image forming magnification of said fourth lens unit at the wide-angle end, and B4T is the image forming magnification of said fourth lens unit at the telephoto end.

4. An inner focus zoom lens comprising, sequentially from an object side:

a first lens unit exhibiting a negative refracting power;

a second lens unit exhibiting a positive refracting power;

a third lens unit exhibiting a negative refracting power; and a fourth lens unit exhibiting a positive refracting power, wherein, when effecting zooming from a wide-angle end to a telephoto end, said fourth lens unit is moved toward said object side, an air spacing between said first lens unit and said second lens unit is reduced, an air spacing between said second lens unit and said third lens unit is extended, and an air spacing between said third lens unit and said fourth lens unit is reduced, focusing from a long distance object to a short distance object is performed by integrally moving said second lens unit and said third lens unit toward an image side, and said inner focus zoom lens satisfies the following conditions:

$$|f4 / f1-3W| < 0.4$$

$$|f4 / f1-3T| < 0.25$$

where f4 is the focal length of said fourth lens unit, f1-3W is the combined focal length from said first lens unit to said third lens unit at the wide-angle end, and f1-3T is the combined focal length from said first lens unit to said third lens unit at the telephoto end.

5. An inner focus zoom lens, comprising sequentially from an object side:

a first lens unit exhibiting a positive refracting power;

a second lens unit exhibiting a negative refracting power;

a third lens unit exhibiting a positive refracting power; and a fourth lens unit exhibiting a positive refracting power, wherein zooming from a wide-angle end to a telephoto end is performed by changing an air spacing between said first lens unit and said second lens unit, an air spacing between said second lens unit and said third lens unit and an air spacing between said third lens unit and said fourth lens unit, and focusing from a long distance object to a short distance object is effected by integrally moving said second lens unit and said third lens unit toward an image side.

6. An inner focus zoom lens according to claim 5 wherein said fourth lens unit moves toward the object side when performing zooming from the wide-angle end to the telephoto end.

7. An inner focus zoom lens according to claim 5, wherein said first lens unit moves toward the object side when performing zooming from the wide-angle end to the telephoto end.

8. An inner focus zoom lens according to claim 6, wherein the air spacing between said first lens unit and said second lens unit is extended, and the air spacing between said second lens unit and said third lens unit is reduced when performing zooming from the wide-angle end to the telephoto end.

9. An inner focus zoom lens according to claim 8, wherein the air spacing between said third lens unit and said fourth lens unit at the wide-angle end is larger than the air spacing between said third lens unit and said fourth lens unit at the telephoto end.

10. An inner focus zoom lens unit according to claim 6, wherein said inner focus zoom lens satisfies the following condition:

$$0.05 < X4 / f4 < 0.50$$

where X4 is the moving quantity of said fourth lens unit with respect to an image plane when performing zooming from the wide-angle end to the telephoto end, and f4 is the focal length of said fourth lens unit.

11. An inner focus zoom lens according to claim 6, wherein said inner focus zoom lens satisfies the following conditions:

$$|B4W| < 0.4$$

$$|B4T| < 0.4$$

where B4W is the image forming magnification of said fourth lens unit at the wide-angle end, and B4T is the image forming magnification of said fourth lens unit at the telephoto end.

12. An inner focus zoom lens unit according to claim 6, wherein said inner focus zoom lens satisfies the following condition:

$$-0.3 < |B4W| - |B4T| < 0.3$$

where B4W is the image forming magnification of said fourth lens unit at the wide-angle end, and B4T is the image forming magnification of said fourth lens unit at the telephoto end.

13. An inner focus zoom lens according to claim 6, wherein said inner focus zoom lens satisfies the following conditions:

$$|f4 / f1-3W| < 0.4$$

$$|f4 / f1-3T| < 0.5$$

where f4 is the focal length of said fourth lens unit, f1-3W is the combined focal length from said first lens unit to said third lens unit at the wide-angle end, and f1-3T is the combined focal length from said first lens unit to said third lens unit at the telephoto end.

14. An inner focus zoom lens according to claim 6, wherein said inner focus zoom lens satisfies the following conditions:

f1-3W / fW > 4 f1-3T / fW < -4 where fW is the focal length of said zoom lens at the wide-angle end, f1-3W is the combined focal length from said first lens unit to said third lens unit at the wide-angle end, and f1-3T is the combined focal length from said first lens unit to said third lens unit at the telephoto end.

15. An inner focus zoom lens comprising:
   a front lens unit disposed closest to an object side and exhibiting a positive refracting power;
   a rear lens unit disposed closest to an image side; and
   an intermediate lens unit disposed therebetween,
   wherein said front lens unit and said rear lens unit move together in the optical-axis direction when performing zooming,
   said intermediate lens unit moves integrally when effecting focusing while said front lens unit and said rear lens unit are static, and
   at least one air spacing within said intermediate lens unit is variable during zooming.

16. An inner focus zoom lens according to claim 15, wherein said intermediate lens unit includes two lens units and said zoom lens consists of four lens units, in which said front lens unit is closest to the object side.

* * * * *